United States Patent [19]
Reid et al.

[11] Patent Number: 6,028,645
[45] Date of Patent: Feb. 22, 2000

[54] DIGITAL VIDEO EFFECTS APPARATUS AND METHOD THEREFOR

[75] Inventors: Paul J. Reid; Nicholas Banks, both of London, United Kingdom

[73] Assignee: Tektronix, Inc., Wilsonville, Oreg.

[21] Appl. No.: 08/826,649

[22] Filed: Apr. 4, 1997

[30] Foreign Application Priority Data

Apr. 12, 1996 [GB] United Kingdom ............... 9607573

[51] Int. Cl.[7] .................................................. H04N 5/262
[52] U.S. Cl. .................... 348/578; 348/580; 348/581; 348/583; 345/118
[58] Field of Search ................................ 348/578, 579, 348/580, 581, 583, 586; 345/118, 139, 427; H04N 5/262

[56] References Cited

U.S. PATENT DOCUMENTS

| | | | |
|---|---|---|---|
| 4,752,828 | 6/1988 | Chapuis et al. | 348/580 |
| 4,790,028 | 12/1988 | Ramage | 382/298 |
| 4,850,028 | 7/1989 | Kawamura et al. | 382/296 |
| 4,916,540 | 4/1990 | Kosaka | 358/160 |
| 4,949,286 | 8/1990 | Ohba | 395/125 |
| 4,965,844 | 10/1990 | Oka et al. | 395/125 |
| 4,985,756 | 1/1991 | Kawabe et al. | 348/580 |
| 5,053,760 | 10/1991 | Frasier et al. . | |
| 5,268,677 | 12/1993 | Frasier et al. . | |
| 5,404,316 | 4/1995 | Klingler et al. | 395/328 |
| 5,448,301 | 9/1995 | Michener | 348/578 |
| 5,457,370 | 10/1995 | Edwards | 318/571 |
| 5,521,648 | 5/1996 | Shiraishi et al. | 348/580 |
| 5,550,565 | 8/1996 | Shiraishi et al. | 345/190 |
| 5,598,486 | 1/1997 | Moriwake et al. | 382/293 |
| 5,646,697 | 7/1997 | Kurashige | 348/459 |
| 5,682,326 | 10/1997 | Klingler et al. | 345/302 |
| 5,687,331 | 11/1997 | Volk et al. | 345/327 |
| 5,701,163 | 12/1997 | Richards et al. | 348/578 |
| 5,745,126 | 4/1998 | Jain et al. | 348/42 |
| 5,768,415 | 6/1998 | Jagadish et al. | 382/154 |

FOREIGN PATENT DOCUMENTS

| | | | |
|---|---|---|---|
| 0353952 | 2/1990 | European Pat. Off. | G06F 15/72 |
| 0476985 | 3/1992 | European Pat. Off. | G11B 27/028 |
| 2 203 918 | 10/1988 | United Kingdom | H04N 5/262 |
| 2223910 | 4/1990 | United Kingdom | H04N 5/262 |
| 2229336 | 9/1990 | United Kingdom | H04N 5/262 |

*Primary Examiner*—Michael H. Lee
*Assistant Examiner*—Jean W. Désir
*Attorney, Agent, or Firm*—Francis I. Gray

[57] ABSTRACT

A digital video effects apparatus has a graphical user interface having a display upon which is produced a video image within a predetermined shape, the video Image being rotated in time and space to represent a 3-dimensional effect. Control points are set by a user together with rotation angles and x–y scaling parameters of the video image. The apparatus interpolates between the control points to provide a smooth transition from control point to control point. The video image is zoomed in and out as the video image changes orientation and/or size so that the video image substantially fills an image area of the graphical user interface display. In the invention the video image is tracked on the GUI display even when it is outside the normally visible screen area.

2 Claims, 2 Drawing Sheets

DIGITAL VIDEO EFFECTS APPARATUS AND METHOD THEREFOR

CROSS-REFERENCE TO RELATED APPLICATION

Not applicable

STATEMENT REGARDING FEDERALLY SPONSORED RESEARCH OR DEVELOPMENT

Not applicable

BACKGROUND OF THE INVENTION

This invention relates to a digital video effects apparatus and method of operation therefor.

A commonly used present day video effect is to provide a video display unit (VDU) upon which is displayed a background and to provide a flying window which is rotated and the size of which may vary so that the window may, for example, fly in from a top left hand corner and grow in size. Normally the flying window carries foreground data which is superimposed on a background video and which foreground gradually displaces the background video. Such an effect is shown in FIG. 1 in which background video data B is produced on a VDU 1, the foreground video data F is produced on a VDU 2 and a composite of the background and foreground video data is produced on a VDU 3. The background B initially substantially fills the composite VDU 3 and the foreground F video data enters the VDU 3 from a corner, for example, may subsequently rotate to produce a 3D effect with respect to the foreground video and may gradually increase in size to displace the background video data.

Such an arrangement does not enable a user to see what is happening to the foreground video off screen of the VDU 3. Furthermore, the foreground video 2 may be an extremely small window being extremely difficult to determine the orientation of the window.

The present invention seeks to overcome the foregoing difficulties.

BRIEF SUMMARY OF THE INVENTION

According to a first aspect of this invention there is provided a digital video effects apparatus including a graphical user interface (GUI) having display means, means for producing a video image within a predetermined shape which may be rotated in time and space on said GUI display means, user defined means for setting control points along a path to be traversed by said video image, and means for zooming said video image in and out as the video image changes orientation and/or size, whereby said video image substantially fills an Image area of the GUI display means.

The present invention has the advantage that said video image is tracked on said GUI display means even when it is outside the normally visible display area.

Preferably said means for producing a video image within a predetermined shape which may be rotated includes means for determining x–y scaling parameters and rotation angles set by a user, and means for interpolating between said control points to provide a smooth transition of said image between said control points.

Advantageously said predetermined shape is rectangular.

Advantageously said image area of the video display unit is either the whole image area of said GUI display means or a window area within the image area of said display means.

In one embodiment, said video image is a rectangular wire frame outline which is rotated to provide a 3D effect, and in another embodiment said rectangular wire frame outline may be filled with a pictorial image. In said another embodiment the pictorial image may be, for example, 1024×768 pixels in size, each pixel being manipulated when orienting said video image to provide said 3D effect.

According to a second aspect of this invention there is provided a method of operating a digital video effects apparatus having a graphical user interface (GUI) that incorporates a display means comprising the steps of producing a video image within a predetermined shape which may be rotated in time and space on said GUI display means, setting user defined control points along a path to be traversed by said video image, and zooming said video image in and out as the video image changes orientation and/or size such that said video image substantially fills an image area of the GUI display means.

BRIEF DESCRIPTION OF THE SEVERAL VIEWS OF THE DRAWING

The invention will now be described by way of example with reference to the accompanying drawings in which.

In the Figures like reference numerals denote like parts.

DETAILED DESCRIPTION OF THE INVENTION

Figure 1:
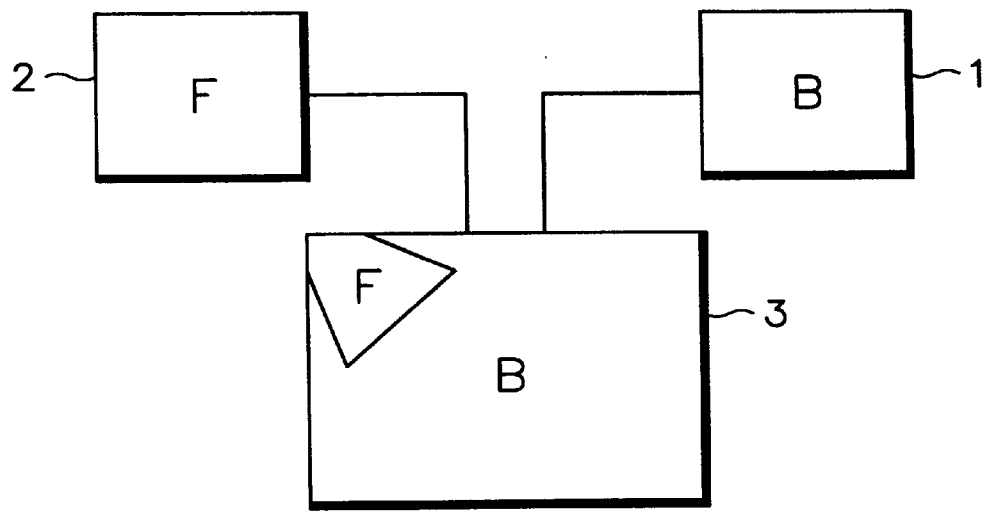
FIG. 1 shows In schematic form a prior art device.
Figure 2:
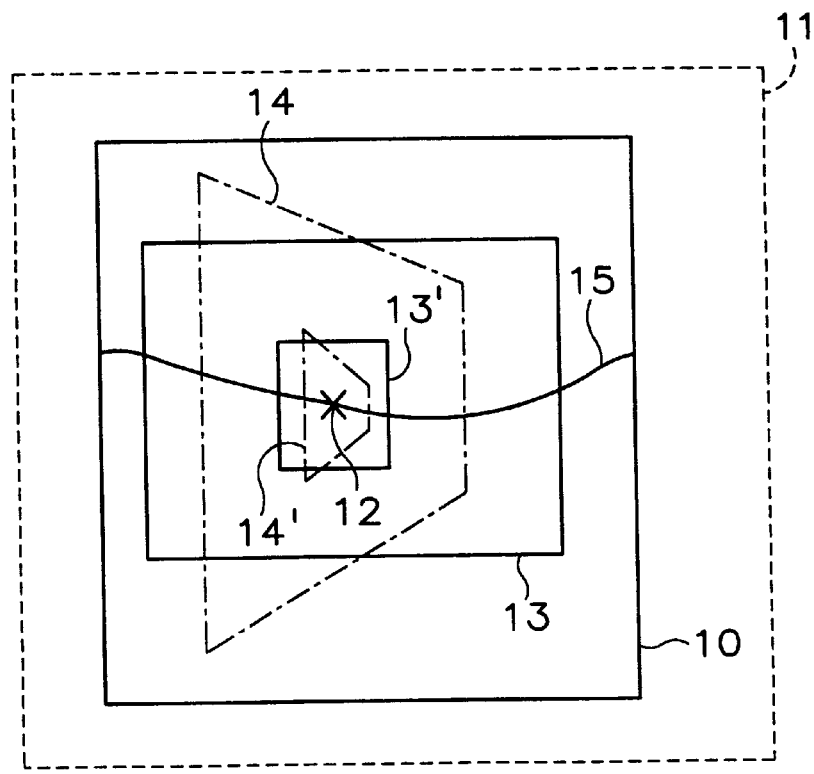
FIG. 2 shows a schematic representation of a video image being rotated about a control point as used in this Invention.

The video image shown in FIG. 2 is of a window area 10 within a graphical user interface (GUI) monitor display 11. A control point 12 has centered thereabouts a rectangular video image 13, although it is to be understood that centering is not strictly necessary. Rotation of the rectangular image 13 is shown by chain broken lines 14. In rotating the rectangular image a number of transformations are effected, for example translation, scaling and rotation, known per se, over the duration of the effect. The rectangular image may initially be small, 13' and rotated, 14'. The movement of the control point is along a motion path 15.

Figure 3:
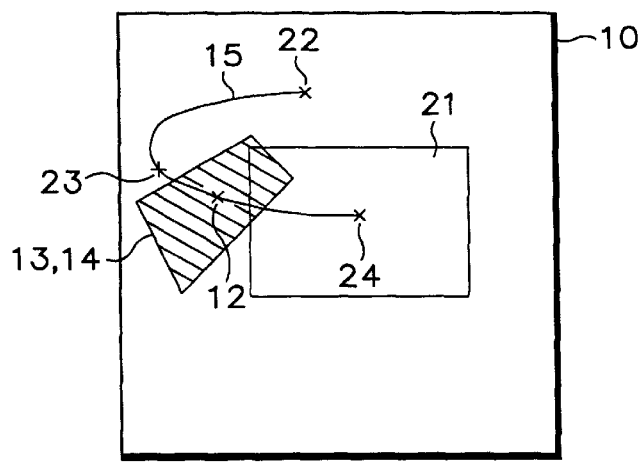
FIG. 3 shows a schematic representation of the digital video effect in accordance with this Invention.

FIG. 3 shows the GUI display window area 10 in which is indicated a visible screen area 21 in which background information is located and a foreground video image 13, 14 is shown shaded. Control points along which the rectangular image 13, 14 moves are defined by a user and are indicated by additional points 22, 23, 24.

Once a user has defined the control points 12, 22–24 then the motion path is calculated to provide smooth transitions in rotation of the video image. Thus rotation angles and x–y scaling parameters are set at the control points by the user and these parameters are interpolated to provide smooth transitions from control point to control point. The control points may be placed outside the visible screen area 21 so the DVE GUI display provides a larger key port than the "target" visible screen area 21.

In this invention it is not required for the user to specify values for the parameters of the video image at every frame of the effect but the user merely has to set the values at a number of discrete points or "key frames" 22, 23, 12, 24. These values, as previously mentioned, are then automatically interpolated by a CPU to provide smooth transitions between the key frames.

Figure 4:
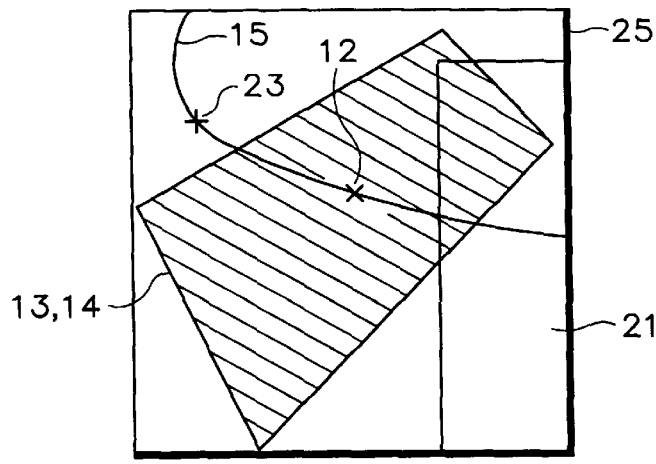
FIG. 4 shows the video image falling an image area of a GUI display.

As shown in FIG. 4, with this invention, which is referred to as "track and fit", the GUI display preferably produces a windowed view 25 within the display 10. It is to be understood that the whole of the image area of the display 10 could alternatively be used. Video image 13, 14 is manipulated so that it substantially fills the entire window 25 area as the window is rotated along the motion path 15 through the key frames 22, 23, 12, 24. The window thus zooms in and out of the effect area as the image changes orientation and/or size. This allows the user to adjust parameters without having to worry whether the result will be visible on the GUI display.

Thus the present invention allows a user to see a foreground image 13, 14 and its orientation throughout the whole DVE by zooming the foreground image.

So as to produce the video image in full size, the image is projected onto a screen and a camera position vis-a-vis the screen is varied back and forth until the image on the camera screen is completely filled. Starting with a flat plane, the position of the video image is calculated in two dimensions. The image is rotated using rotation angles and x–y scaling parameters to represent a 3-dimensional image. The 3-dimensional coordinates are projected back onto a 2-dimensional plane. This procedure is repeated for each frame. A camera is focused onto the center of the image and the largest x–y coordinates are determined. The camera position is adjusted with respect to the image to fill the camera screen, i.e. the track and fit window view.

Although the video image may simply be a rectangular wire frame outline, in a preferred embodiment, the outline is filled with a pictorial image. For example, the pictorial image may be 1024×768 pixels in size and each pixel is manipulated when orienting the video image.

Figure 5:
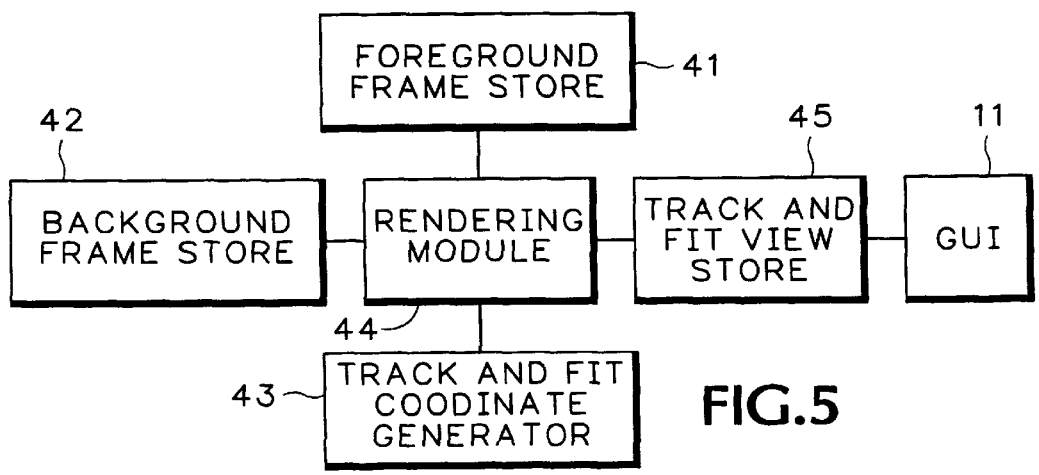
FIG. 5 shows a simplified block schematic diagram of the digital effects apparatus in accordance with this invention.

The block schematic diagram shown in FIG. 5 has a background frame store 42, a foreground frame store 41 and a track and fit coordinate generator 43. The frame stores 41 and 42 are known per se and the track and fit coordinate generator 43 is designed to provide the coordinates of the image as explained above. Outputs from the stores 41, 42 and the track and fit coordinate generator 43 are input to a rendering module 44 which produces the schematic representation on the display 10 shown in FIG. 3 and which may be "zoomed in" as shown in FIG. 4. Output from the module 44 is applied to a track and fit store 45 prior to the display of the track and fit window view 25 on the GUI display 11.

We claim:

1. A method of operating a digital video effects apparatus having a graphical user interface display comprising the steps of:

opening a window area within the graphical user interface display, the window area including at least a portion of a visible screen area;

producing within the window area a video image having a control point and a predetermined shape including an orientation and size relative to the control point;

setting user defined parameters for the control point at key frames along a motion path displayed within the window area, the parameters defining the orientation and size at each key frame and the motion path lying partially outside the visible screen area; and zooming the video image in and out as the video image moves along the motion path from key frame to key frame and changes orientation and size so that the video image substantially fills the window area during such movement.

2. A digital video effects apparatus having a graphical user interface display comprising:

a window area within the graphical user interface display, the window area including at least a portion of a visible screen area;

a video image having a control point and a predetermined shape including an orientation and size situated within the window area;

means for setting user defined parameters for the control point at key frames along a motion path displayed within the window area to define a video effect, the parameters defining the orientation and size at each key frame and the motion path lying partially outside the visible screen area; and means for zooming the video image in and out as the video image moves along the motion path from key frame to key frame and changes orientation and size so that the video image substantially fills the window area during such movement.

* * * * *